United States Patent [19]

Throssell

[11] 4,283,672
[45] Aug. 11, 1981

[54] STEPPER MOTOR DRIVE

[75] Inventor: Raymond W. Throssell, Partridge Green, England

[73] Assignee: The Monotype Corporation Limited, Redhill, England

[21] Appl. No.: 101,064

[22] Filed: Dec. 7, 1979

[30] Foreign Application Priority Data

Dec. 18, 1978 [GB] United Kingdom ............... 48950/78

[51] Int. Cl.³ ............................................. G05B 19/40
[52] U.S. Cl. ..................................................... 318/696
[58] Field of Search ............................... 318/696, 685

[56] References Cited
U.S. PATENT DOCUMENTS

| | | | |
|---|---|---|---|
| 4,091,316 | 5/1978 | Friedman | 318/696 |
| 4,121,145 | 10/1978 | Talmadge | 318/696 |
| 4,140,956 | 2/1979 | Pritchard | 318/696 |

Primary Examiner—J. V. Truhe
Assistant Examiner—Eugene S. Indyk
Attorney, Agent, or Firm—Morgan, Finnegan, Pine, Foley & Lee

[57] ABSTRACT

A stepper motor drive which sequentially energizes the windings of a stepper motor (1,2,3,4). The drive includes a binary counter (11) fed by a clock signal and two multipliers (D.A.C.1, D.A.C.2) which are fed by the binary counter (11) and a reference signal. An adjustable feedback network (30) is arranged to combine a fraction of the output of the multipliers ($V_1$, $V_2$) with the reference signal so that the output of the multiplier represents unequal steps of a staircase waveform. A switching network (13) under the control of the counter (11) applies to the windings drive signals in accordance with the output of the multipliers.

Each winding has its own amplifier (15,17) to control its current, and pairs of antiphase signals from the switching network (13) are combined in the amplifiers to produce symmetrical changes of current in a respective pair of coils (1 and 2 or 3 and 4). The feedback network (30) distorts the otherwise linear outputs from the multipliers (D.A.C.1, D.A.C.2) and the degree of distortion can be adjusted to compensate for non-linearity in the stepper motor.

6 Claims, 2 Drawing Figures

STEPPER MOTOR DRIVE

FIELD OF THE INVENTION

This invention relates to a stepper motor drive, and more particularly to a drive which can be adjusted to energise the coils of a stepper motor to give equal incremental steps and a smooth motion.

BACKGROUND TO THE INVENTION

In known stepper motors having a plurality of windings the stepping motion is produced by energisation of the windings in a particular sequence. For example, a stepper motor may have in one revolution two hundred main stepping positions which are defined by selectively energising pairs of windings. A smoother motion for such a motor may be attained by dividing each main stepping position into a number of smaller steps by decreasing the energisation of the windings in a corresponding number of stages. It may be desirable that the steps of a stepper motor are as equal as possible, but owing to non-linearity in the motor, equal increments of current in the windings of the motor might not produce correspondingly equal steps.

SUMMARY OF THE INVENTION

The present invention provides a stepper motor drive which is arranged to sequentially energise the windings of a stepper motor, the drive including at least one generator of a staircase signal comprising a multiplier fed by a reference signal and the output of a clocked binary counter, an adjustable feedback network which is arranged to combine a fraction of the output of the multiplier with the reference signal, so that the output of the multiplier represents unequal steps of a staircase waveform, and a switching network which under the control of the counter applies to the windings drive signals in accordance with the output of the multiplier.

A preferred embodiment of the invention will now be described with reference to and as illustrated in the accompanying drawings.

DESCRIPTION OF THE PREFERRED EMBODIMENT

Figure 1:
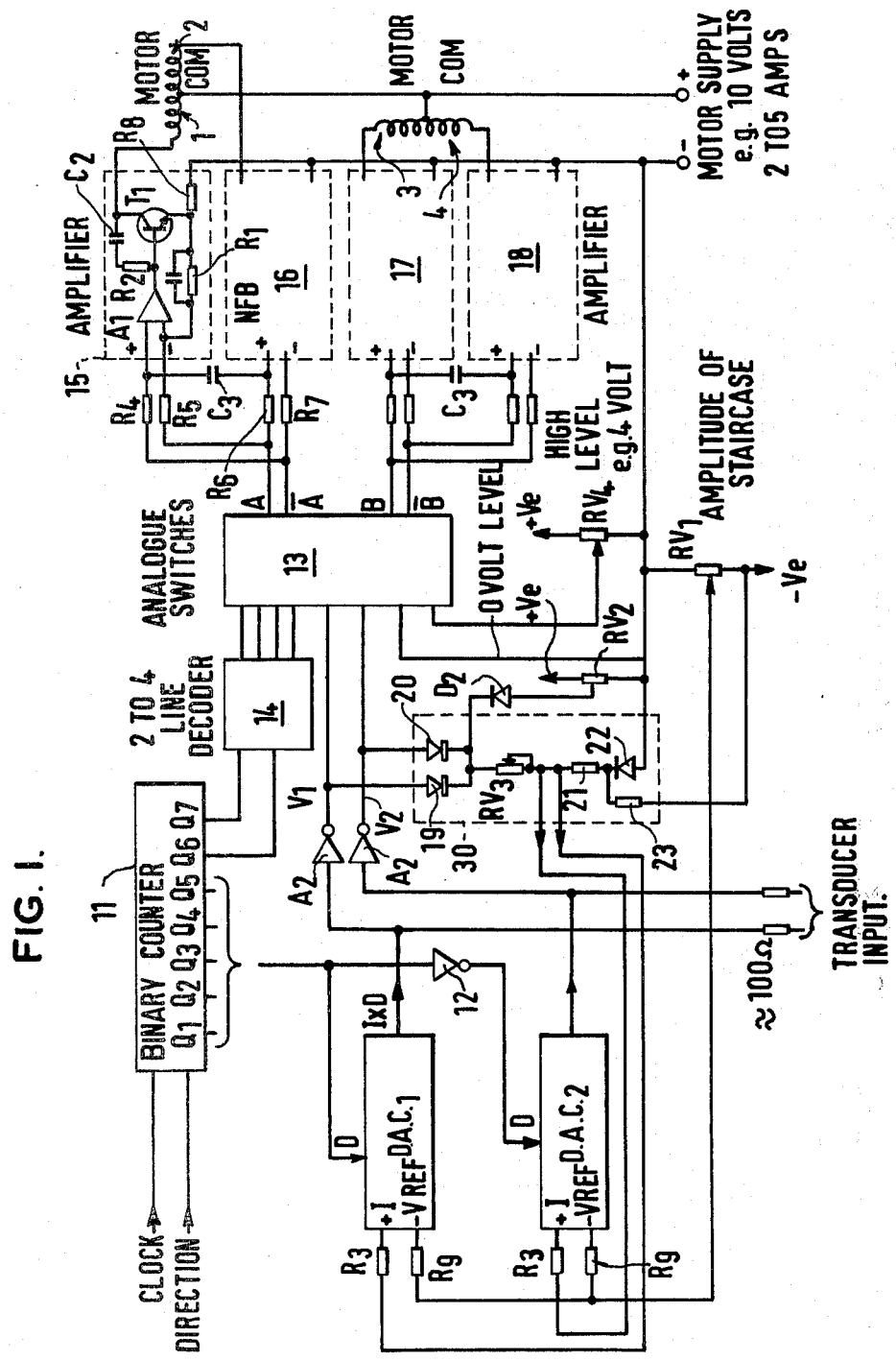
FIG. 1 shows a circuit diagram of a stepper motor drive according to the invention.

FIG. 1 shows an arrangement which is suitable for driving a four phase stepper motor having two hundred main stepping positions per revolution, the main steps are each divided into thirty two smaller steps by the drive. The features of the stepper motor are not shown, however, its four windings (1, 2, 3, 4) and their connections to the drive are illustrated schematically. In order to rotate the motor pairs of windings are energised in antiphase, thus the current in one winding is gradually increased whilst the current in its corresponding winding is decreased. The state of energisation of this pair of windings then remains constant while a similar increase and decrease of current takes place in the other pair of windings. In this example the increase or decrease of current in a winding is effected in thirty two steps which are smoothed into a gradually rising or falling waveform as shown in FIG. 2E.

The motor is driven at the rate of one step for each pulse supplied by a clock (not shown) to a seven bit bidirectional binary counter (11). The first five least significant outputs ($Q_1$ to $Q_5$) of the binary counter (11) produce the split of each main step into the thirty two smaller steps each corresponding to a clock pulse; the remaining two outputs ($Q_6$ and $Q_7$) control the four phases which make up one electrical cycle of the motor. (Thus there are fifty electrical) cycles per revolution and four main steps per electrical cycle). The binary counter (11) can count up or down according to the signal applied to its direction input, which can be used to alter the direction in which the motor rotates.

The binary signal from the first five outputs ($Q_1$ to $Q_5$) is supplied to a first digital to analogue converter (D.A.C.1) and through an inverter to a second digital to analogue converter (D.A.C.2). The two digital to analogue converters (D.A.C.1, D.A.C.2) are multipliers, thus one gives a rising current staircase output while the other provides a falling current staircase. The amplitudes of the staircases depend on the reference currents (I) supplied to each counter. The current inputs of the converters are connected in parallel each through a respective input resistor; these resistors are generally identified as $R_3$ and $R_9$. One terminal of each converter (indicated by + I in the drawing) is connected through its input resistor ($R_3$), a second resistor (21) and a diode (22) to a zero voltage level; the other terminal of the converters (indicated by −VREF) is connected to the movable contact of a potentiometer (RV1) across the zero voltage level and a negative level. Between the diode (22) and the resistor (21) a further resistor (23) leads to the negative level.

The potentiometer (RV1) adjusts the voltage across the input resistors and can therefore be used to alter the amplitude of the staircases according to the load and speed of the motor.

The drive circuit can be matched to the characteristics of the motor so that even stepping is produced notwithstanding any non-linearity in the motor by which equal increments of current do not give rise to equal steps by the motor; in order to give equal steps the drive provides the windings with current in steps of adjustable magnitude; adjustment of the steps is made possible by incorporating into the circuit an analogue feed-back network (30).

The two current staircases are fed by respective amplifiers ($A_2$) and the resulting voltage staircases are passed to a set of analogue switches (13) the function of which will be described later. The amplifiers ($A_2$) are inverting operational amplifiers with negative feedback applied in order to convert the current output of the D.A.C.'s to a voltage output. A balancing potentiometer may be necessary to equalise the output amplitudes. The voltage staircase are fed back to the positive input (+I) through the input resistor ($R_3$) of each converter (D.A.C.1, D.A.C.2). For feedback each staircase is led through a respective rectifier (19, 20) to a common variable resistor ($RV_3$) which controls the amplitude of the feedback signal. This main feedback signal is at the 4th harmonic and a D.C. bias applied through a diode ($D_2$) clips the 4th harmonic to produce higher order harmonics. A potentiometer $RV_2$ controls the amount of D.C. bias to the diode ($D_2$) which is connected between diodes (19, 20) and the potentiometer $RV_3$) of the main feedback network.

The effect of the feedback circuit is to apply a deformation to the otherwise linearly increasing and decreasing staircase signals ($V_1$, $V_2$) by adjusting the level of the reference current supplied to the two digital to analogue converters (D.A.C.1, D.A.C.2). The two potentiometers of the feedback circuit ($RV_2$, $RV_3$) permit alteration of the shape and amplitude of the deformation applied to the staircases ($V_1$, $V_2$). Thus the feedback circuit can be adjusted to vary its deformation of the staircase signals ($V_1$ and $V_2$) so that the motor rotates in equal steps. The particular design of the feedback circuit will vary according to the characteristics of the stepper motor it is required to drive. The circuit illustrated in FIG. I is suitable for a SLO-SYN motor. The analogue switches (13) energise the windings (1,2,3,4) of the motor in the sequence required for stepping rotation. A two to four line decoder (14) fed by the last two outputs ($Q_6$ and $Q_7$) of the binary counter (11) provides the controlling signal for the analogue siwtches (13). The two staircase signals ($V_1$,$V_2$), a zero voltage level, and a high level which is adjustable by a potentiometer ($RV_4$) are mixed in the analogue switches (13) under the control of the decoder (14) to provide two pairs of antiphase signals (A, $\overline{A}$ and B, $\overline{B}$). The antiphase signals are not symmetrical due to the distortion applied by the feedback network.

In FIG. 2 there are shown (not to scale) five waveforms at various points on the circuit of FIG. 1. FIG. 2A shows the outputs at amplifiers ($A_2$). FIG. 2B shows the voltage level at the junction of the diodes ($D_2$, 19, 20) and the potentiometer ($RV_3$). FIGS. 2C and 2D show the outputs of the analogue switches, and FIG. 2E shows the voltage across resistor $R_8$ in the output amplifier of motor winding (3). The signal waveform (FIG. 2B) of the feedback network (30) has a fundamental frequency which is four times that of the drive signal (FIG. 2E) applied to a single winding. Thus, as shown in FIG. 2A the staircase signals ($V_1$ and $V_2$) consist of a non-linear portion (X) and a linear portion (Y). The non-linear portion is due to the deformation applied by the feedback network (30) which clips the combined waveform of $V_1$ and $V_2$, as shown in FIG. 2B which shows the potential at the cathode of diode $D_2$.

Each winding (1,2,3,4) is driven by a respective one of four identical amplifiers (15,16,17,18) only one of which (15) is illustrated in detail. A pair of antiphase signals are fed to a respective pair of amplifiers.

Figure 2A:
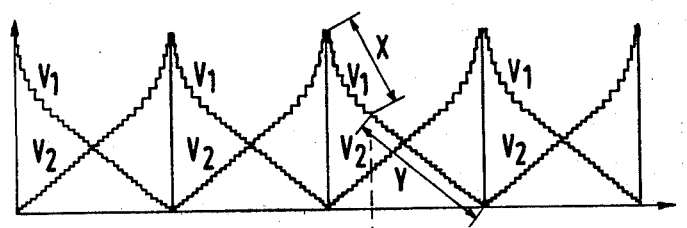
FIGS. 2A–2E shows five waveforms at various points in the circuit of FIG. 1 in which the ordinate axis indicates voltage and time is represented along the abscissor.
Figure 2B:
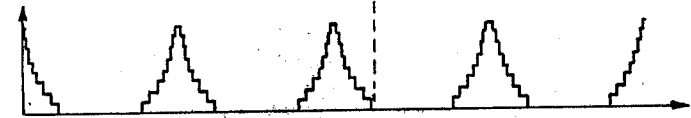
Figure 2C:
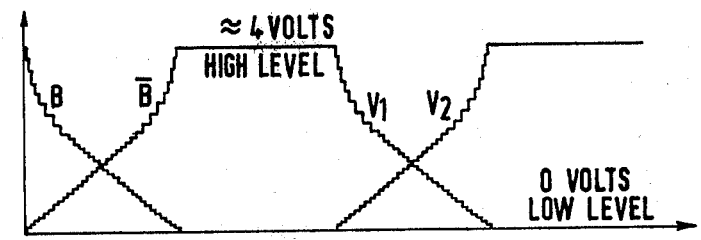
Figure 2D:
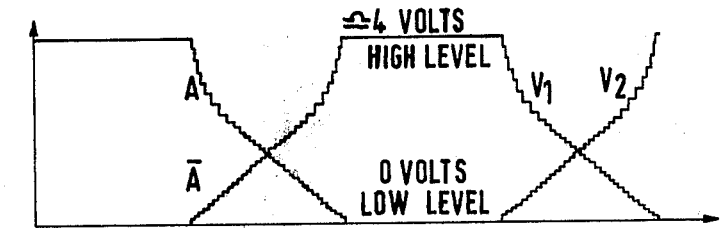
Figure 2E:
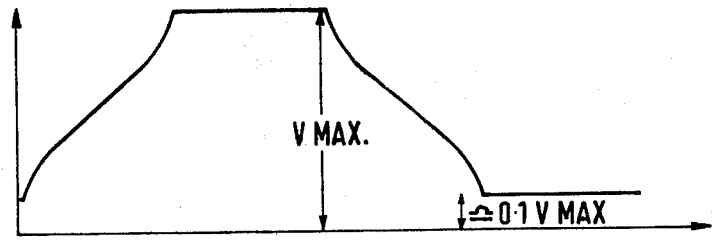

It is desirable that the increase in current in one motor winding is accompanied by a corresponding symmetrical decrease in current in the other motor winding of a pair; however, due to the feedback network the antiphase signals (A, $\overline{A}$ and B, $\overline{B}$) are asymmetrical (FIGS. 2C and 2D). The signals are mixed in the amplifiers to provide symmetrical outputs to drive the motor. In each pair of amplifiers the input signals to one amplifier are applied to the opposite terminals of the other amplifier. Thus, in the illustrated circuit A, $\overline{A}$ are applied respectively through $R_5$ and $R_4$ to one amplifier (15) in a pair, while the signals are exchanged when applied through resistors $R_6$ and $R_7$ to the other amplifier (16). The amplifiers in each pair are connected together by a capacitor ($C_3$) which provides some integration of the steps of the motor. In each amplifier (15,16,17,18) the input signals is fed to a current amplifier ($A_1$) which is connected to a Darlington transistor ($T_1$) which controls the current through a respective motor winding in series with a resistor ($R_8$) which can be used to monitor the amount in the respective motor winding. FIG. 2E shows the symmetrical smoothed waveform produced across $R_8$ of amplifier 17 which results from combing outputs B and $\overline{B}$ of the analogue switches (13).

Negative feedback to the amplifier ($A_1$) is taken via a resistor ($R_1$) and a capacitor ($C_1$) from the output resistor ($R_8$). The capacitor ($C_1$) provides additional integration of the steps.

In order to counter the effect of increased impedance of the motor windings at higher frequencies leading to oscillation each amplifier includes a local feedback network for the transistor ($R_2$, $C_2$). The capacitor ($C_2$) is given a larger capacitance than would be needed merely to prevent oscillation in order to provide the motor with electronic damping. In addition the shaft of the motor may also be mechanically damped, this can improve stopping and starting accuracy. During continuous running mechanical damping helps to prevent resonance at certain speeds; in any event the mechanical damping need only be light.

The position of the motor can be altered without affecting the clock count by applying a signal to the inputs of the amplifiers ($A_2$) which feed the analogue switches (13). The applied signal alters the position of the motor by producing a small shift in the phase of the staircase signals ($V_1$,$V_2$). If it is desired to reduce further any variation in the speed of the motor this can be effected by taking negative feedback from a velocity transducer fitted to the shaft of the motor. The transducer can supply a signal to the amplifiers ($A_1$) which feed the analogue switches (13) as before. At constant motor speed the transducer should give zero output and if the motor is to be started and stopped the transducer should accordingly be switched in and out of operation.

I claims:

1. A stepper motor drive which is arranged to sequentially energise the windings of a stepper motor, the drive including at least one generator of a staircase signal comprising a multiplier fed by a reference signal and the output of a clocked binary counter, an adjustable feedback network which is arranged to combine a fraction of the output of the mutliplier with the reference signal, so that the output of the multiplier represents unequal steps of a staircase waveform, and a switching network which under the control of the counter applies to the windings drive signals in accordance with the output of the multiplier.

2. A drive according to claim 1 further comprising a second multiplier, and an amplifier for applying current to a winding of said motor; the first and the second of said multipliers providing outputs representing an asymmetrically falling staircase waveform and an asymmetrically rising staircase waveform the shapes of which are at least partly determined by the feedback network, which waveforms are fed by the switching network to said amplifier which combines the waveforms such that a symmetrical waveform is applied to the motor winding.

3. A drive according to claim 2 further comprising additional amplifiers for applying currents to additional windings of said motor; the staircase waveforms being also fed to the amplifier of a corresponding motor winding such that when a symmetrically falling waveform is applied to one winding of said motor, a symmetrically rising waveform is applied to another winding of said motor.

4. A drive according to claim 2 or claim 3 in which the multipliers are fed by a common reference signal, and the feedback network is common to both multipliers.

5. A drive according to claim 1 in which the direction of rotation of the motor is reversible by reversing the direction of counting of the binary counter.

6. A drive according to claim 1 in which the multipliers are digital to analogue converters.

* * * * *